United States Patent
Tsujita

(10) Patent No.: US 11,872,854 B2
(45) Date of Patent: Jan. 16, 2024

(54) TRANSMITTER AND TIRE CONDITION MONITORING APPARATUS

(71) Applicant: PACIFIC INDUSTRIAL CO., LTD., Ogaki (JP)

(72) Inventor: Yasuhisa Tsujita, Motosu (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 721 days.

(21) Appl. No.: 16/340,975

(22) PCT Filed: Dec. 5, 2017

(86) PCT No.: PCT/JP2017/043696
§ 371 (c)(1),
(2) Date: Jul. 29, 2021

(87) PCT Pub. No.: WO2019/111330
PCT Pub. Date: Jun. 13, 2019

(65) Prior Publication Data
US 2021/0362553 A1    Nov. 25, 2021

(51) Int. Cl.
*B60C 23/04* (2006.01)

(52) U.S. Cl.
CPC ........ *B60C 23/0459* (2013.01); *B60C 23/044* (2013.01); *B60C 23/0464* (2013.01)

(58) Field of Classification Search
CPC .............. B60C 23/0459; B60C 23/044; B60C 23/0464; B60C 23/0461; B60C 23/02; B60C 23/04

(Continued)

(56) References Cited

U.S. PATENT DOCUMENTS 7,403,105 B2 * 7/2008 Watabe ............... B60C 23/0433
340/447
7,705,714 B2 * 4/2010 Mori ................... B60C 23/0416
340/447

(Continued)

FOREIGN PATENT DOCUMENTS

JP           06300837 H      10/1994
JP        2005309958 A      11/2005

(Continued)

OTHER PUBLICATIONS

International Search Report issued in application No. PCT/JP2017/043696, dated Mar. 13, 2018; 5 pages.

*Primary Examiner* — Eric Blount
(74) *Attorney, Agent, or Firm* — CANTOR COLBURN LLP

(57) ABSTRACT

A transmitter is configured to be attached to each of wheel assemblies provided in a vehicle and execute a process in accordance with a command included in a trigger signal transmitted from a trigger device. The transmitter includes a battery, a condition detecting section, which detects a condition of the transmitter, a trigger receiving section, which receives, as the trigger signal, an unmodulated wave having a received signal strength indication greater than or equal to a predetermined received signal strength indication, a transmitting section, which transmits a signal, a controlling section, which performs response transmission, by which the signal is transmitted to the transmitting section in response to the unmodulated wave, when the trigger receiving section receives the unmodulated wave, and a memory section, which stores at least one of reception time of the unmodulated wave and a number of times of the response transmission.

6 Claims, 3 Drawing Sheets

(58) Field of Classification Search
USPC .................................................. 340/442–449
See application file for complete search history.

(56) References Cited

U.S. PATENT DOCUMENTS

| | | | | |
|---|---|---|---|---|
| 7,705,719 | B2* | 4/2010 | Mori | B60C 23/0416 |
| | | | | 340/447 |
| 7,924,147 | B2* | 4/2011 | Mathias | B60C 23/0416 |
| | | | | 73/146 |
| 8,723,662 | B2* | 5/2014 | Watabe | B60C 23/0416 |
| | | | | 73/146 |
| 9,193,224 | B2* | 11/2015 | Kosugi | B60C 23/0488 |
| 10,780,748 | B2* | 9/2020 | Takeyama | H04Q 9/00 |
| 11,724,552 | B2* | 8/2023 | Tsujita | B60C 23/0437 |
| | | | | 340/442 |
| 2004/0183664 | A1* | 9/2004 | McClelland | B60C 23/0416 |
| | | | | 340/442 |
| 2004/0206167 | A1* | 10/2004 | Pacsai | B60C 23/0408 |
| | | | | 73/146 |
| 2015/0336433 | A1* | 11/2015 | Naruse | B60C 23/0472 |
| | | | | 73/146.4 |
| 2021/0362553 | A1* | 11/2021 | Tsujita | B60C 23/04 |

FOREIGN PATENT DOCUMENTS

| | | | |
|---|---|---|---|
| JP | 2005324611 | A | 11/2005 |
| JP | 2006523562 | A | 10/2006 |
| JP | 2014091344 | A | 5/2014 |
| JP | 2015095236 | A | 5/2015 |

\* cited by examiner

TRANSMITTER AND TIRE CONDITION MONITORING APPARATUS

BACKGROUND

The present invention relates to a transmitter and a tire condition monitoring apparatus.

Japanese Laid-Open Patent Publication No. 2014-91344 discloses one example of a tire condition monitoring apparatus installed in a vehicle equipped with wheel assemblies. The tire condition monitoring apparatus of Patent Document 1 includes transmitters, which are respectively attached to the wheel assemblies, and a receiver.

The transmitter includes a pressure sensor, which detects the pressure of the tire, a transmitting section, a controlling section, which controls the transmitter, and a battery as a power source for the transmitter. The transmitting section transmits signals. The signals include a signal that contains the detection result detected by the pressure sensor. The transmitter periodically transmits signals to the receiver.

The transmitter also includes a trigger receiving section, which is capable of receiving a trigger signal transmitted from a trigger device. The trigger signal is transmitted from the trigger device when giving a command to the transmitter from outside. The trigger signal is transmitted to the transmitter, for example, when transmission of a signal from the transmitter at arbitrary time is desired or when the mode of the transmitter is desired to be changed. When the trigger signal is received by the trigger receiving section, the controlling section performs control in accordance with the command. When the trigger signal is received by the trigger receiving section, the controlling section performs response transmission to cause the transmitting section to transmit a signal in response to the reception of the trigger signal. This allows the trigger device to recognize that the trigger signal has been received by the trigger receiving section.

Trigger signals are of an unmodulated wave or a modulated wave. When the transmitter is compatible with trigger signals of an unmodulated wave, the trigger receiving section receives, as trigger signals, unmodulated waves having a received signal strength indication greater than or equal to a predetermined received signal strength indication.

SUMMARY OF THE INVENTION

The present invention is generally directed to transmitters and tire conditioning apparatus.

One of the problems of prior art transmitters is that they move with movement of the vehicle. Therefore, the surrounding environment of the transmitters changes with movement of the vehicle. Depending on the surrounding environment, unmodulated waves of the same frequency band as the trigger signal frequency band or a frequency band approximate to the trigger signal frequency band are being transmitted. When such an unmodulated wave is received by the trigger receiving section, the transmitting section transmits a signal in response to the unmodulated wave. Therefore, depending on the surrounding environment, the transmitter misidentifies an unmodulated wave different from the trigger signal as a trigger signal, so that response transmission is repeatedly performed. This increases the power consumption of the battery.

The capacity of the battery is determined so as to be able to drive the transmitter at least for a period of time that is set in advance. For example, the capacity of the battery is determined not to run out for more than ten years, while taking the power required to drive the transmitter into consideration. However, despite the fact that the capacity of the battery is determined in this way, the capacity of the battery may be exhausted before the end of the period of time that is set in advance. In this case, it is assumed that the battery power has been excessively consumed due to response transmission to unmodulated waves, or battery life is shortened due to malfunctions of the battery itself. In order to identify the reason why the life of the battery has been shortened, it is desired that the transmitter be able to check the influence of the reception of unmodulated waves on the battery.

It is an objective of the present invention to provide a transmitter and a tire condition monitoring apparatus that are capable of checking the influence of the reception of unmodulated waves on a battery.

To achieve the foregoing objective and in accordance with a first aspect of the present invention, a transmitter is provided that is configured to be attached to each of wheel assemblies provided in a vehicle and execute a process in accordance with a command included in a trigger signal transmitted from a trigger device. The transmitter includes a battery, which serves as a power source for the transmitter, a condition detecting section, which is configured to detect a condition of the transmitter, a trigger receiving section, which is configured to receive, as the trigger signal, an unmodulated wave having a received signal strength indication greater than or equal to a predetermined received signal strength indication, a transmitting section, which is configured to transmit a signal, a controlling section, which is configured to perform response transmission, by which the signal is transmitted to the transmitting section in response to the unmodulated wave, when the trigger receiving section receives the unmodulated wave, and a memory section, which is configured to store at least one of reception time of the unmodulated wave and a number of times of the response transmission.

With this configuration, the influence of response transmission on the battery can be obtained based on the data stored in the memory section. For example, it can be said that if the reception time of an unmodulated wave is long or if the number of times of response transmission is large, the influence of the reception of an unmodulated wave on the life of the battery is great. Accordingly, the influence of the reception of an unmodulated wave on the battery can be checked by storing at least one of the reception time of an unmodulated wave and the number of times of response transmission in the memory section.

In the above-described transmitter, the memory section stores at least the reception time of the unmodulated wave, and the controlling section is configured to determine whether to regard the unmodulated wave as the trigger signal based on the reception time of the unmodulated wave stored in the memory section.

This configuration is capable of determining whether to regard an unmodulated wave as a trigger signal based on the reception time of the unmodulated wave.

In the above-described transmitter, the memory section stores at least the number of times of the response transmission, and the controlling section is configured to determine whether to regard the unmodulated wave as the trigger signal based on the number of times of the response transmission stored in the memory section.

This configuration is capable of determining whether to regard an unmodulated wave as a trigger signal based on the number of times of response transmission.

The above-described transmitter further includes a traveling detecting section, which detects traveling and stopping of the vehicle. The controlling section is configured to: determine whether to regard, as the trigger signal, the unmodulated wave that is received by the trigger receiving section when the vehicle is at a stopped state, and cause the transmitting section to transmit the signal to a receiver mounted on the vehicle when traveling of the vehicle is detected after determining not to regard, as the trigger signal, the unmodulated wave that is received by the trigger receiving section when the vehicle is at a stopped state. The signal includes data configured to cause the receiver to recognize that the unmodulated wave received when the vehicle is at a stopped state is not regarded as the trigger signal.

With this configuration, if the trigger receiving section receives an unmodulated wave different from a trigger signal when the vehicle is at a stopped state while misidentifying the unmodulated wave as a trigger signal, the controlling section determines not to regard the received unmodulated wave as a trigger signal. Then, a signal including data for causing the receiver to recognize that fact is transmitted to the receiver. The vehicle has a function of storing data of a failure of devices as diagnostic data. By transmitting a signal including the above data to the receiver, the fact that an unmodulated wave that is not regarded as a trigger signal has been received is stored as diagnostic data. The diagnostic data can be read using a scan tool. From the diagnostic data, it is possible to check the influence of the reception of the unmodulated wave on the battery.

In the above-described transmitter, the memory section stores at least the number of times of the response transmission. The controlling section is configured to cause the transmitting section to transmit the signal to a receiver mounted on the vehicle when a predetermined condition set for a detection result of the condition detecting section is met, the signal including the number of times of the response transmission or a number of times it is determined that the unmodulated wave is not regarded as the trigger signal.

With this configuration, the number of times of response transmission or the number of times it is determined not to regard an unmodulated wave as a trigger signal is stored as diagnostic data. From the diagnostic data, it is possible to check the influence of the reception of the unmodulated wave on the battery.

In the above-described transmitter, the trigger receiving section is capable of receiving a trigger signal of a modulated wave. The memory section stores at least the number of times of the response transmission. The controlling section is configured to cause the transmitting section to transmit the signal to at least one of the trigger device and a receiver mounted on the vehicle in response to the trigger signal of a modulated wave received by the trigger receiving section, the signal including the number of times of the response transmission or a number of times it is determined that the unmodulated wave is not regarded as the trigger signal.

With this configuration, when a signal is transmitted toward the trigger device, it is possible to obtain, using the trigger device, the number of times of response transmission or the number of times it is determined not to regard an unmodulated wave as a trigger signal. When a signal is transmitted toward the receiver, the number of times of response transmission or the number of times it is determined not to regard an unmodulated wave as a trigger signal is stored as diagnostic data. It is thus possible to check the influence of the reception of an unmodulated wave on the battery.

To achieve the foregoing objective and in accordance with a second aspect of the present invention, a tire condition monitoring apparatus including a transmitter and a receiver mounted on the vehicle is provided. The transmitter is configured to be attached to each of wheel assemblies provided in a vehicle and execute a process in accordance with a command included in a trigger signal transmitted from a trigger device. The transmitter includes a battery, which serves as a power source for the transmitter, a condition detecting section, which is configured to detect a condition of the transmitter, a trigger receiving section, which is configured to receive, as the trigger signal, an unmodulated wave having a received signal strength indication greater than or equal to a predetermined received signal strength indication, a transmitting section, which is configured to transmit a signal, a controlling section, which is configured to perform response transmission, by which the signal is transmitted to the transmitting section in response to the unmodulated wave, when the trigger receiving section receives the unmodulated wave, a memory section, which is configured to store at least one of reception time of the unmodulated wave and a number of times of the response transmission, and a traveling detecting section, which detects traveling and stopping of the vehicle. The controlling section is configured to determine whether to regard, as the trigger signal, the unmodulated wave that is received by the trigger receiving section when the vehicle is at a stopped state, and cause the transmitting section to transmit the signal to the receiver when traveling of the vehicle is detected after determining not to regard, as the trigger signal, the unmodulated wave that is received by the trigger receiving section when the vehicle is at a stopped state. The signal includes data configured to cause the receiver to recognize that the unmodulated wave received when the vehicle is at a stopped state is not regarded as the trigger signal. The receiver includes a receiving section, which is configured to receive a signal transmitted from the transmitting section, and a reception controlling section, which is configured to perform control of the receiver. The reception controlling section is configured to store the data included in the signal in a vehicle memory section mounted on the vehicle when the reception controlling section receives the signal.

With this configuration, the vehicle memory section stores, as diagnostic data, data configured to cause the receiver to recognize that an unmodulated wave received when the vehicle is at a stopped state is not regarded as a trigger signal. From the diagnostic data, it is possible to check the influence of the reception of the unmodulated wave on the battery.

To achieve the foregoing objective and in accordance with a third aspect of the present invention, a tire condition monitoring apparatus including a transmitter and a receiver mounted on the vehicle is provided. The transmitter is configured to be attached to each of wheel assemblies provided in a vehicle and execute a process in accordance with a command included in a trigger signal transmitted from a trigger device. The transmitter includes a battery, which serves as a power source for the transmitter, a condition detecting section, which is configured to detect a condition of the transmitter, a trigger receiving section, which is configured to receive, as the trigger signal, an unmodulated wave having a received signal strength indication greater than or equal to a predetermined received signal strength indication, a transmitting section, which is configured to transmit a signal, a controlling section, which is configured to perform response transmission, by which the signal is transmitted to the transmitting section in response to the unmodulated wave, when the trigger receiving section receives the unmodulated wave, and a memory section, which is configured to store a number of times of the response transmission. The controlling section is configured to cause the transmitting section to transmit the signal to the receiver when a predetermined condition set for a detection result of the condition detecting section is met, the signal including the number of times of the response transmission or a number of times it is determined that the unmodulated wave is not regarded as the trigger signal. The receiver includes a receiving section, which is configured to receive a signal transmitted from the transmitting section, and a reception controlling section, which is configured to perform control of the receiver. The reception controlling section is configured to store, when receiving the signal, one of the number of times of the response transmission and a number of times it is determined that the unmodulated wave is not regarded as the trigger signal, which are included in the signal, in a vehicle memory section mounted on the vehicle.

With this configuration, the number of times of response transmission or the number of times it is determined not to regard an unmodulated wave as a trigger signal is stored as diagnostic data in the vehicle memory section. From the diagnostic data, it is possible to check the influence of the reception of the unmodulated wave on the battery.

The present invention allows the influence of the reception of an unmodulated wave on the battery to be checked.

DETAILED DESCRIPTION OF THE INVENTION

In one or more embodiments, a transmitter and a tire condition monitoring apparatus according will now be described.

Figure 1:
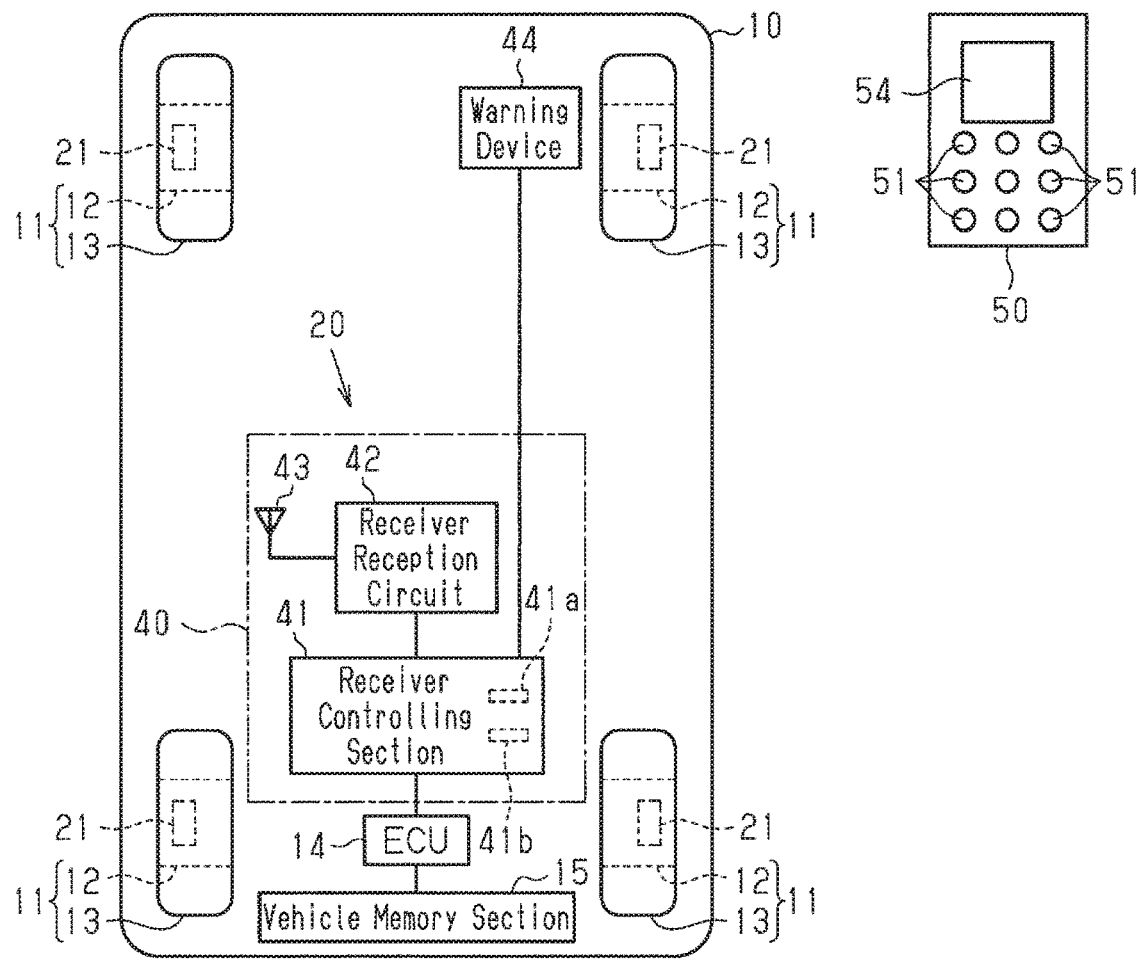
FIG. 1 is a schematic diagram of a tire condition monitoring apparatus and a trigger device.

As shown in FIG. 1, a tire condition monitoring apparatus 20 includes transmitters 21 and a receiver 40. Each transmitter 21 is configured to be attached to one of the four wheel assemblies 11 of a vehicle 10. The receiver 40 is installed in the vehicle 10.

Each of the wheel assemblies 11 includes a wheel 12 and a tire 13 attached to the wheel 12. Each transmitter 21 is of a type that is fixed to the tire valve, the wheel 12, or the tire 13.

The vehicle 10 has multiple electronic control units (ECUs) 14, only one of which is shown in the drawing. The ECUs 14 of the vehicle 10 each have a self-diagnosis function of making failure determination for sensors and devices such as actuators of the vehicle 10. The vehicle 10 includes a vehicle memory section 15, which is configured to store device failure information as diagnostic data when a failure of a device is detected by the self-determination function of any of the ECUs 14. The diagnostic data stored in the vehicle memory section 15 can be read using a scan tool.

The transmitter 21 is attached to the wheel assembly 11 so as to be arranged in the inner space of the tire 13. The transmitter 21 detects the condition of the corresponding tire 13, for example, the air pressure and internal temperature of the tire 13 and wirelessly transmits a signal including the detection results to the receiver 40. The tire condition monitoring apparatus 20 monitors the conditions of the tires 13 by receiving signals transmitted from the transmitters 21 at the receiver 40.

Figure 2:
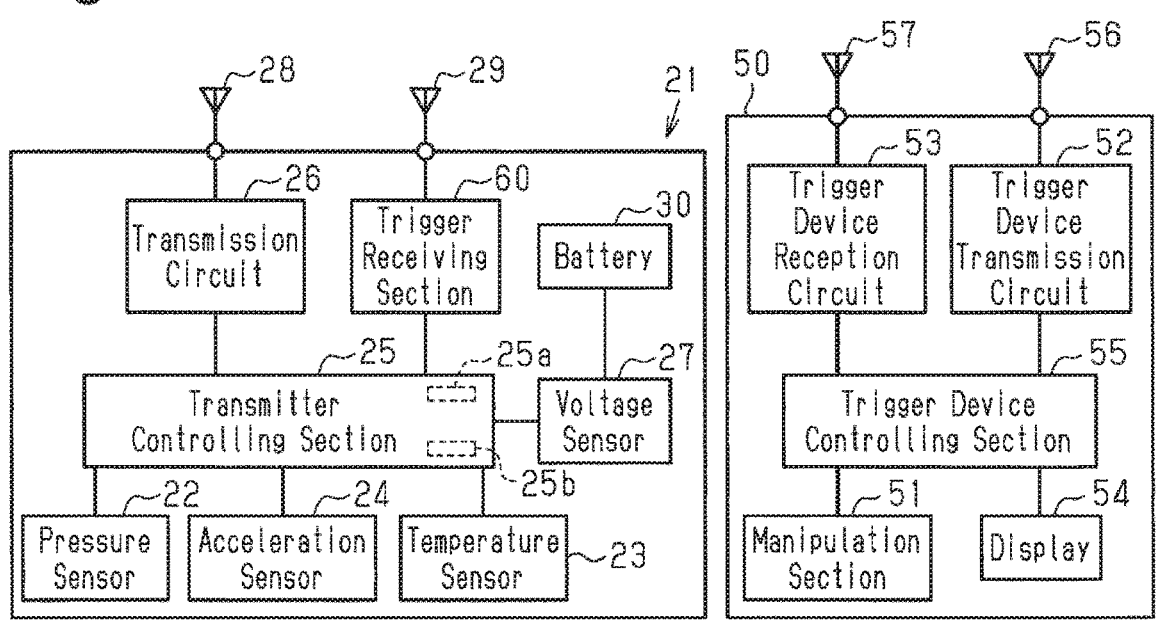
FIG. 2 is a schematic diagram of a transmitter and the trigger device.

As shown in FIG. 2, the transmitter 21 includes a pressure sensor 22, a temperature sensor 23, an acceleration sensor 24, a transmitter controlling section 25, a transmission circuit 26, a transmission antenna 28, a reception antenna 29, a battery 30, and a trigger receiving section 60.

The pressure sensor 22 detects the pressure (air pressure) of the corresponding tire 13. The pressure sensor 22 outputs the detection result to the transmitter controlling section 25. The temperature sensor 23 detects the temperature inside the corresponding tire 13. The temperature sensor 23 outputs the detection result to the transmitter controlling section 25.

The acceleration sensor 24 rotates integrally with the wheel assembly 11 to detect the centrifugal acceleration acting on the transmitter 21. The centrifugal acceleration acting on the transmitter 21 can be regarded as the centrifugal acceleration acting on the wheel assembly 11. The acceleration sensor 24 outputs the detection result to the transmitter controlling section 25.

The voltage of the battery 30 (the voltage across the terminals of the battery 30) is detected by a voltage sensor 27. The voltage sensor 27 outputs the detection result to the transmitter controlling section 25. In the present embodiment, the acceleration sensor 24 and the voltage sensor 27 constitute a condition detecting section that detects the condition of the transmitter 21.

The transmitter controlling section 25, which serves as a controlling section, is composed of circuitry such as a microcomputer including a CPU 25a and a memory section 25b (such as a RAM and a ROM). The transmitter controlling section 25 includes a timing function. An ID code, which is identification information unique to each transmitter 21, is registered in the memory section 25b. The memory section 25b stores various programs for controlling the transmitter 21. The memory section 25b of the present embodiment is a nonvolatile memory.

The transmitter controlling section 25 may include dedicated hardware (application specific integrated circuit: ASIC) that executes at least part of various processes. That is, the transmitter controlling section 25 may be circuitry including 1) one or more processors that operate according to a computer program (software), 2) one or more dedicated hardware circuits such as an ASIC, or 3) a combination thereof. The processor includes a CPU and memory such as a RAM and ROM. The memory stores program codes or instructions configured to cause the CPU to execute processes. The memory, or computer readable medium, includes any type of medium that is accessible by general-purpose computers and dedicated computers.

The transmitter controlling section 25 generates data and outputs it to the transmission circuit 26. The transmission circuit 26, which functions as a transmitting section, modulates the data from the transmitter controlling section 25 to generate a signal (radio frequency (RF) signal), and transmits the signal through the transmission antenna 28. For example, the transmitter controlling section 25 generates data including the ID code and the tire condition, which includes the detection result of the pressure sensor 22 and the detection result of the temperature sensor 23. The transmitter controlling section 25 transmits a data signal, which includes the data. The data signal is transmitted at a predetermined interval.

The transmitter controlling section 25 determines whether the vehicle 10 is traveling based on the detection result of the acceleration sensor 24. The centrifugal acceleration acting on the wheel assembly 11 increases as the speed of the vehicle 10 increases. The transmitter controlling section 25 determines that the vehicle 10 is traveling when the centrifugal acceleration detected by the acceleration sensor 24 exceeds a preset threshold value. The threshold value is set to a value greater than the centrifugal acceleration detected when the vehicle 10 is at a stopped state. In the present embodiment, the acceleration sensor 24 functions as a traveling detecting section.

The transmitter controlling section 25 makes the transmission interval of the data signal shorter in a case in which the centrifugal acceleration detected by the acceleration sensor 24 is greater than or equal to the threshold value than in a case in which the centrifugal acceleration detected by the acceleration sensor 24 is less than the threshold value. As a result, during traveling of the vehicle 10, the data signal is transmitted more frequently than when the vehicle 10 is at a stopped state.

The battery 30 serves as a power source for the transmitter 21. The battery 30 may be a primary battery or a rechargeable battery. The capacity of the battery 30 is determined such that the transmitter 21 can be driven at least for a period of time that is set in advance. In the present embodiment, the capacity of the battery 30 is determined not to run out for more than ten years, while taking the power required to drive the transmitter 21 into consideration. The power required to drive the transmitter 21 is mainly the power required to transmit signals from the transmission circuit 26.

As shown in FIG. 1, the receiver 40 includes a receiver controlling section 41, a receiver reception circuit 42, and a reception antenna 43. A warning device 44 is connected to the receiver controlling section 41, which serves as a reception controlling section. The receiver controlling section 41 is composed of a microcomputer including a receiver CPU 41a and a receiver memory section 41b (such as a ROM and a RAM).

The receiver controlling section 41 may include dedicated hardware (application specific integrated circuit: ASIC) that executes at least part of various processes. That is, the receiver controlling section 41 may be circuitry including 1) one or more processors that operate according to a computer program (software), 2) one or more dedicated hardware circuits such as an ASIC, or 3) a combination thereof. The processor includes a CPU and memory such as a RAM and ROM. The memory stores program codes or instructions configured to cause the CPU to execute processes. The memory, or computer readable medium, includes any type of medium that is accessible by general-purpose computers and dedicated computers.

The receiver reception circuit 42, which serves as a receiving section, demodulates data signals transmitted from the transmitters 21 and received via the reception antenna 43 and delivers the demodulated signals to the receiver controlling section 41.

The receiver controlling section 41 obtains the condition of the tire 13 based on the data included in the data signal transmitted from the transmitter 21. When an anomaly occurs in any of the tires 13, the receiver controlling section 41 performs notification by using the warning device (notification device) 44. For example, the warning device 44 may be a device that notifies the user of the anomaly with sound or illumination or blinking of light. Also, the receiver controlling section 41 may display the condition of the tire 13 on the display unit that the occupants of the vehicle 10 can visually recognize.

The transmitter 21 can perform various actions in response to a trigger signal transmitted from a trigger device 50. The trigger signal may be, for example, a signal for requesting the transmitter 21 to transmit a data signal containing various information, a signal for requesting the transmitter 21 to change the transmission interval of data signals, a signal for requesting the transmitter 21 to register an ID code in the memory section 25b, and a signal for updating the software of the transmitter 21. The trigger device 50 is found, for example, at maintenance facilities such as dealers and production bases such as a factory that manufactures the transmitters 21 and a factory where the transmitters 21 are attached to the wheel assemblies 11.

Hereinafter, the trigger device 50 and the trigger receiving section 60 of the transmitter 21 will be described.

As shown in FIGS. 1 and 2, the trigger device 50 includes multiple manipulation sections 51, a trigger device transmission circuit 52, a trigger device reception circuit 53, a display 54, a trigger device controlling section 55, a trigger device transmission antenna 56, and a trigger device reception antenna 57. The manipulation sections 51 are manipulated by the user. The user of the trigger device 50 can specify operations that he/she requests the transmitter 21 to do by operating the manipulation sections 51. The trigger device 50 transmits a trigger signal requesting an operation corresponding to the manipulation of the manipulation sections 51.

The manipulation sections 51 are connected to the trigger device controlling section 55. The trigger device controlling section 55 generates data in response to manipulation of the manipulation sections 51. This data includes a command option that is a command to the transmitter 21.

The trigger device controlling section 55 outputs the generated data to the trigger device transmission circuit 52. The trigger device transmission circuit 52 generates a trigger signal corresponding to the data. The trigger signal is transmitted from the trigger device transmission antenna 56.

The trigger device reception circuit 53 receives a signal (RF signal) transmitted (returned) from the transmitter 21 via the trigger device reception antenna 57. The trigger device reception circuit 53 demodulates the signal and outputs it to the trigger device controlling section 55.

The types of the trigger device 50 include the one that employs carrier detect and the one that employs telegram as the communication method. The carrier detect is a method that uses an unmodulated wave as the trigger signal. The telegram is a method that uses a modulated wave as the trigger signal.

Figure 3A:
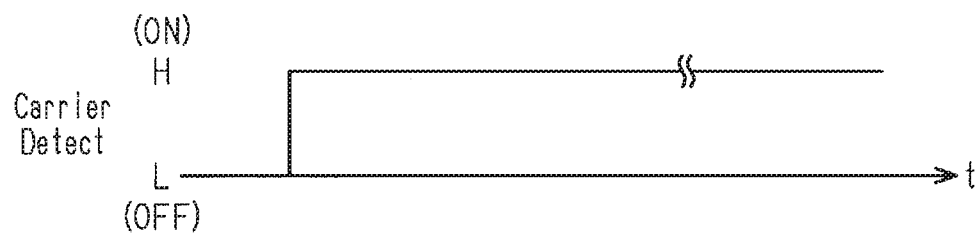
FIG. 3A is a schematic diagram showing a trigger signal of an unmodulated wave.

As shown in FIG. 3A, when the trigger device 50 employs the carrier detect, an unmodulated wave in an LF band (for example, 125 kHz band) is used as the trigger signal.

Figure 3B:
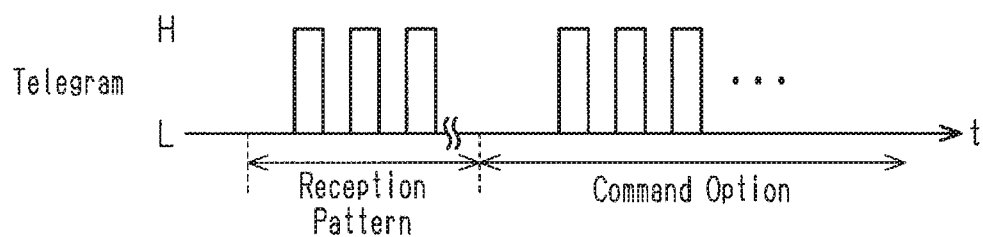
FIG. 3B is a schematic diagram showing a trigger signal of a modulated wave.

As shown in FIG. 3B, when the trigger device 50 employs the telegram, a modulated wave in an LF band (for example, 125 kHz band) is used as the trigger signal. A signal obtained by modulating a digital signal obtained by encoding data of 73 bits in total is used as the trigger signal. The encoding is executed, for example, by Manchester code. The modulation is executed, for example, with amplitude shift keying (ASK).

The above-mentioned 73-bit data includes a command option and a reception pattern (pattern including a preamble, a synchronization bit, and a wake-up ID) for causing the trigger receiving section 60 to recognize that it is a trigger signal. The reception pattern is defined by the telegram and is always the same. The command option differs depending on the action the transmitter 21 is requested to perform. Using the command option, it is possible to request the transmitter 21 to perform the action corresponding to the manipulation section 51. The above data is not limited to 73-bit data but may have other data lengths.

Next, the trigger receiving section 60 of the transmitter 21 will be described.

Figure 4:
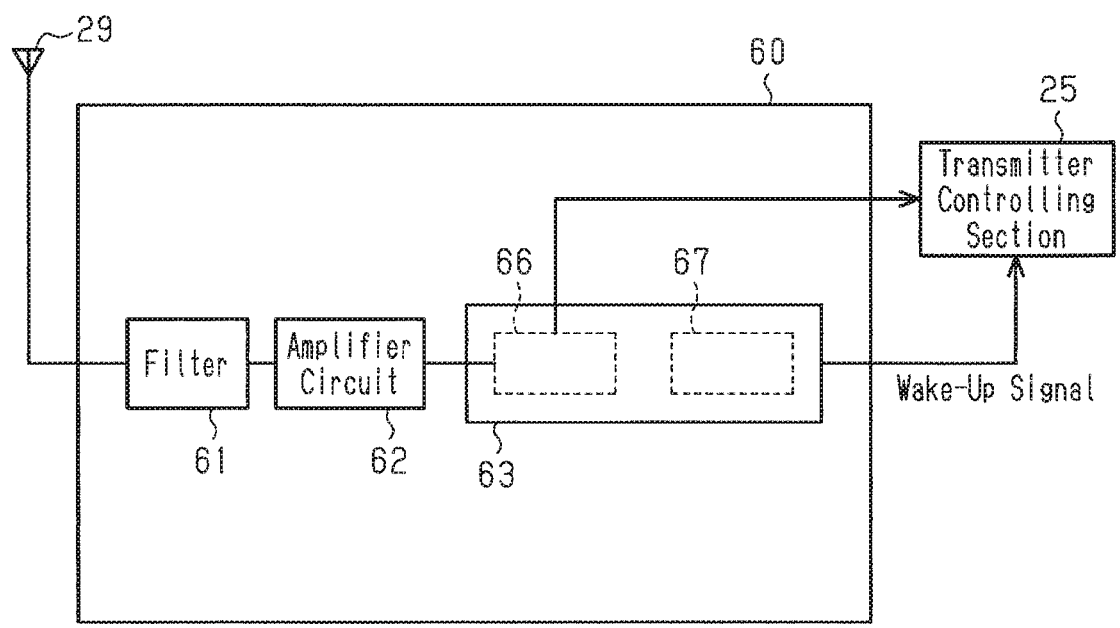
FIG. 4 is a schematic diagram showing the trigger receiving section.

As shown in FIG. 4, the trigger receiving section 60 includes a filter 61, which passes only a signal of a specific frequency band out of signals arriving at the reception antenna 29, an amplifier circuit 62, which amplifies a signal passing through the filter 61, and a determination section (determination circuit) 63, which determines whether the amplified signal is a trigger signal.

The filter 61 removes noise by permitting passage of signals of, for example, an LF band (for example, a 125 kHz band). The amplifier circuit 62 is composed of, for example, an amplifier of which the gain is variable or multiple amplifiers having different gains.

The trigger receiving section 60 of the present embodiment is capable of receiving both of the trigger signal of an unmodulated wave and a trigger signal of a modulated wave. The determination section 63 includes a first determination section 66 (first determination function) and a second determination section 67 (second determination function).

The first determination section 66 determines whether the received signal strength indication (RSSI) [dBm] of an unmodulated wave is greater than or equal to a predetermined RSSI. The predetermined RSSI is set in advance according to, for example, the output of the trigger device 50. An unmodulated wave the RSSI of which is determined to be greater than or equal to the predetermined RSSI by the first determination section 66 is received as a trigger signal of an unmodulated wave. However, since even an unmodulated wave different from a trigger signal is received as a trigger signal if it is an unmodulated wave having an RSSI greater than or equal to the predetermined RSSI, unmodulated waves that are received as trigger signals may include unmodulated waves different from a trigger signal.

The second determination section 67 determines whether the reception pattern included in a modulated wave (signal) matches with a preset reception pattern (reception pattern defined by the telegram). The second determination section 67 determines that a signal is a trigger signal when the reception pattern included in that signal matches with a preset reception pattern. The determination section 63 alternately repeats the determination by the first determination section 66 and the determination by the second determination section 67. Accordingly, the determination section 63 is capable of receiving both of a trigger signal of an unmodulated wave and a trigger signal of a modulated wave.

The determination section 63 has a function of sending a wake-up signal to the transmitter controlling section 25. Since there are only a few opportunities to receive a trigger signal, the transmitter controlling section 25 turns off the reception function until receiving a wake-up signal to save power. The determination section 63 transmits a wakeup signal when an unmodulated wave the RSSI of which is greater than or equal to the predetermined RSSI and when a modulated wave that matches with the preset reception pattern is received. The transmitter controlling section 25 acquires a trigger signal upon reception of the wake-up signal. As a result, the transmitter controlling section 25 recognizes the action requested by the trigger device 50. "Reception" in the trigger receiving section 60 refers to causing the transmitter controlling section 25 to receive the data included in a trigger signal.

When the trigger receiving section 60 receives a trigger signal, the transmitter controlling section 25 performs response transmission to cause the transmission circuit 26 to transmit a signal in response to the reception of the trigger signal. The signal transmitted by response transmission is a signal for informing the trigger device 50 that a trigger signal has been received.

Figure 5:
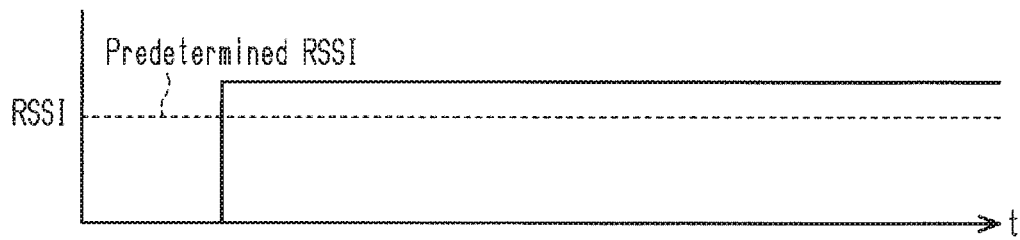
FIG. 5 is a diagram showing the relationship between an unmodulated wave and response transmission.
Figure 5:
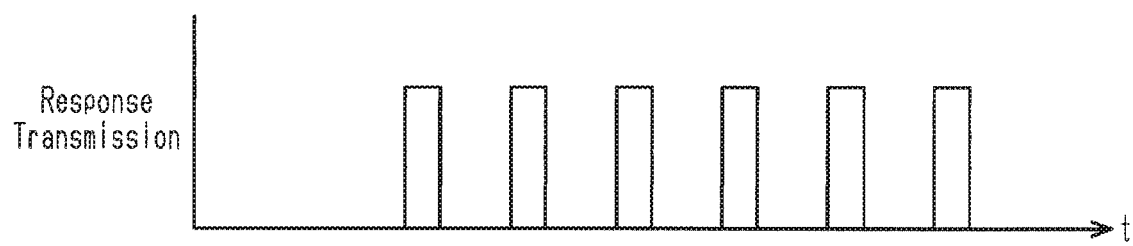

As shown in FIG. 5, when an unmodulated wave the RSSI of which is greater than or equal to the predetermined RSSI is received by the trigger receiving section 60, the transmitter controlling section 25 performs response transmission.

The transmitter controlling section 25 has a function of determining whether to regard an unmodulated wave as a trigger signal when the unmodulated wave is received by the trigger receiving section 60. With regard to the unmodulated wave received as a trigger signal by the first determination section 66, a determination is made as to whether processing is to be performed on the assumption that the unmodulated wave is a trigger signal. The transmitter controlling section 25 determines whether to regard, as a trigger signal, an unmodulated wave that is received when the centrifugal acceleration detected by the acceleration sensor 24 is less than the threshold value.

The transmitter controlling section 25 measures reception time of an unmodulated wave when the unmodulated wave is received. The memory section 25b stores the reception time of the unmodulated wave. When the reception time of the unmodulated wave reaches a predetermined time, the transmitter controlling section 25 determines not to regard the received unmodulated wave as a trigger signal. That is, if an unmodulated wave is received for a period longer than the predetermined time, the control is performed without regarding the unmodulated wave as a trigger signal regardless of whether the unmodulated wave is a trigger signal. In contrast, the transmitter controlling section 25 performs control while regarding, as a trigger signal, an unmodulated wave of which the reception time does not reach the predetermined time.

When a trigger signal is transmitted by trigger device 50, the transmission of the trigger signal is stopped if response transmission from the transmitter 21 is received or when response transmission cannot be received for a period longer than time that is set in advance. Setting time longer than the time that is set in advance as the predetermined time prevents an unmodulated wave that is not assumed to be a trigger signal from being treated as a trigger signal. Also, there can be a case in which a trigger signal is continuously transmitted from the trigger device 50 and the trigger signal is received for a period longer than the predetermined time. In this case, the received trigger signal is not regarded as a trigger signal. However, as described above, the situation where a trigger signal is transmitted for a period longer than the predetermined time is assumed to be a situation that is not intended by the user of the trigger device 50. Therefore, in a case in which an unmodulated wave that is received for a period longer than the predetermined time is a trigger signal, it is assumed that the use of the transmitter 21 and the trigger device 50 will not be hindered even if the process is executed while regarding the trigger signal not as a trigger signal. Therefore, it can be said that the determination of whether to regard an unmodulated wave as a trigger signal is the determination of whether the unmodulated wave received as a trigger signal is abnormal.

When an unmodulated wave is received for a period longer than the predetermined time while the vehicle 10 is at a stopped state, the transmitter controlling section 25 causes the transmission circuit 26 to transmit a signal including a flag to the receiver 40 at the time of detection of the next traveling.

Figure 6:
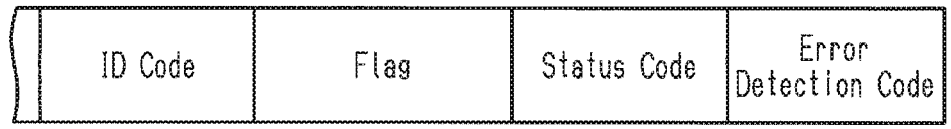
FIG. 6 is a diagram illustrating one example of a frame format of a signal transmitted to the receiver.

As shown in FIG. 6, the signal including a flag includes, as data, an ID code, a flag, a stator scan code, and an error detection code. The transmitter controlling section 25 transmits a signal including a flag one or more times.

The transmitter controlling section 25 deletes the reception time of an unmodulated wave from the memory section 25b each time traveling of the vehicle 10 is detected. In the present embodiment, it can be said that the reception time of an unmodulated wave is used to determine whether the vehicle 10 is in a surrounding environment where unmodulated waves different from a trigger signal is transmitted.

When the receiver reception circuit 42 receives a signal including a flag, the receiver controlling section 41 determines that the transmitter 21 has received an unmodulated wave that is not regarded as a trigger signal. Therefore, it can be said that a signal including a flag is a signal including data (flag) configured to cause the receiver 40 mounted on the vehicle 10 to recognize that the unmodulated wave received by the transmitter 21 is not regarded as a trigger signal.

The receiver controlling section 41 stores, as diagnostic data, the number of times a signal including a flag is received in the vehicle memory section 15. An operation of the transmitter 21 of the present embodiment will now be described.

It is now assumed that the vehicle 10 travels and stops. Depending on the surrounding environment of the vehicle 10, an unmodulated wave in the same frequency band as a trigger signal or in a frequency band approximate to the trigger signal may be transmitted continuously. For example, in a parking lot or on a freeway, there are cases where LF signals are output in or about the 125 kHz band in order to detect the vehicle 10.

When an unmodulated wave other than a trigger signal is misidentified as a trigger signal by the trigger receiving section 60, the transmitter controlling section 25 performs response transmission in response to the unmodulated wave. While the unmodulated wave continues to be received, a signal is transmitted from the transmission circuit 26 intermittently through response transmission.

When continuously receiving an unmodulated wave, the transmitter controlling section 25 regards the received unmodulated wave not as a trigger signal. If an unmodulated wave is transmitted for so long a period that the unmodulated wave cannot be regarded as a trigger signal, it can be determined that the unmodulated wave is not temporary but has been transmitted continuously. That is, when the transmitter controlling section 25 regards a received unmodulated wave not as a trigger signal, it can be said that the vehicle 10 is at a stopped state in a surrounding environment where a signal is continuously transmitted from the transmission circuit 26 by response transmission.

When the vehicle 10 resumes traveling, the centrifugal acceleration detected by the acceleration sensor 24 becomes greater than or equal the threshold value. Then, a signal including a flag is transmitted from the transmitter 21. Accordingly, a signal including a flag is transmitted to the receiver 40.

The number of times the receiver 40 has received a signal including a flag is stored in the vehicle memory section 15. Therefore, by using a scan tool, it is possible to obtain the number of times a signal including a flag has been received. The number of times the receiver 40 has received a signal including a flag can be regarded as the number of times the receiver 40 has been exposed to an environment where the transmitter 21 repeatedly performs response transmission.

When the capacity of the battery 30 runs out in less than ten years, the number of times of reception of a signal including a flag is checked using a scan tool. As described above, the capacity of the battery 30 is determined so as not to run out for more than ten years. External factors that shorten the life of the battery 30 are mainly considered to be response transmission carried out in response to an unmodulated wave that is misidentified as a trigger signal. Therefore, if a signal including a flag has never been received, or if the number of times of reception of a signal including a flag is small, it can be inferred that the battery 30 itself has a problem. If the number of times of reception of a signal including a flag is excessive, it can be determined that response transmission has been repeatedly performed while misidentifying an unmodulated wave different from a trigger signal as a trigger signal. In this case, it can be inferred that the power of the battery 30 has been wasted by response transmission, and the battery 30 itself is not defective.

Accordingly, the first embodiment has the following advantages.

(1-1) The transmitter controlling section 25 stores the reception time of an unmodulated wave in the memory section 25b. Based on this data, the influence of unmodulated wave reception on the life of the battery 30 can be checked. In the present embodiment, whether a received unmodulated wave is regarded as a trigger signal is determined based on the reception time of the unmodulated wave stored in the memory section 25b. The result of the determination is stored in the vehicle memory section 15, so that the influence of reception of the unmodulated wave on the battery 30 can be checked. By storing the reception time of an unmodulated wave in the memory section 25b in this manner, it is possible to check the influence of the reception of the unmodulated wave on the battery 30.

(1-2) The memory section 25b stores the reception time of an unmodulated wave. The transmitter controlling section 25 can determine whether to regard a received unmodulated wave as a trigger signal based on the reception time of the unmodulated wave stored in the memory section 25b.

(1-3) The transmitter controlling section 25 transmits a signal including a flag to the receiver 40. Therefore, it is possible to store in the vehicle memory section 15 the reception of an unmodulated wave that is not regarded as a trigger signal. The data stored in the vehicle memory section 15 can be read using a scan tool. The use of a scan tool allows the influence of the reception of an unmodulated wave on the battery to be checked.

In addition, since a volatile memory is used as the memory section 25b, the data stored in the memory section 25b is deleted when the life of the battery 30 runs out. By storing the number of times of reception of a signal including a flag in the vehicle memory section 15, it is possible to check the influence of the reception of an unmodulated wave on the battery 30 even after the life of the battery 30 runs out.

(1-4) The tire condition monitoring apparatus 20 includes the receiver 40 and the transmitter 21, which is capable of transmitting a signal including a flag. Therefore, a system is established that allows the vehicle memory section 15 to store the reception of a signal including a flag by the receiver 40 even after the life of the battery 30 runs out and the data in the memory section 25b is deleted. It is thus possible to check the influence of the reception of an unmodulated wave on the battery 30.

Next, a transmitter and a tire condition monitoring apparatus according to a second embodiment will be described. The detailed description of the components that are the same as those in the first embodiment will be omitted.

The transmitter controlling section 25 stores the number of times response transmission has been performed in the memory section 25b. In the present embodiment, the number of times of response transmission stored in the memory section 25b is the accumulated number from the start of the use of the battery 30 (transmitter 21).

When a predetermined condition is met, the transmitter controlling section 25 transmits a signal including the number of times of response transmission stored in the memory section 25b to the receiver 40.

Figure 7:
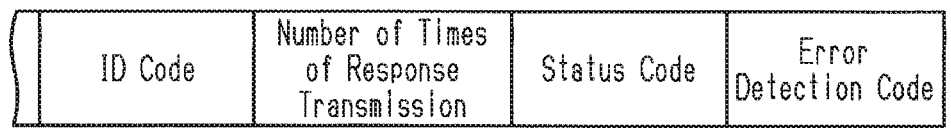
FIG. 7 is a diagram illustrating one example of a frame format of a signal transmitted to the trigger device.

As shown in FIG. 7, the signal including the number of times of response transmission includes, as data, an ID code, the number of times of response transmission, a stator scan code, and an error detection code, for example. The transmitter controlling section 25 transmits a signal including the number of times of response transmission one or more times.

The predetermined condition is set for the detection result of the condition detecting section that detects the condition of the transmitter 21. In the present embodiment, the predetermined condition is set for the detection result of the voltage sensor 27.

The transmitter controlling section 25 transmits a signal including the number of times of response transmission to the receiver 40 when the voltage detected by the voltage sensor 27 becomes lower than or equal to a predetermined voltage. The voltage of the battery 30 decreases as the remaining power of the battery 30 decreases. Therefore, the remaining power of the battery 30, or the remnant life of the battery 30, can be obtained from the voltage of the battery 30. The predetermined voltage is a voltage slightly before the life of the battery 30 runs out and is set to a voltage at which a signal can be transmitted from the transmission circuit 26. For example, the predetermined voltage is set to the voltage when the remaining power of the battery 30 is 5% to 15%. As a result, the number of times of response transmission can be transmitted to the receiver 40 slightly before the life of the battery 30 runs out.

Upon receiving a signal including the number of times of response transmission, the receiver 40 stores the number of times of response transmission included in the signal in the vehicle memory section 15 as diagnostic data. Since a signal including the number of times of response transmission is transmitted slightly before the life of the battery 30 runs out, it is understood that the number of times response transmission has been performed from the start of the use of the battery 30 until the end of the life of the battery 30 is transmitted.

An operation of the transmitter 21 of the present embodiment will now be described.

As described above, the vehicle memory section 15 stores the number of times response transmission has been performed from the start of the use of the battery 30 until the end of the life of the battery 30. The number of times can be read using a scan tool.

A trigger signal is transmitted to the transmitter 21 in limited cases such as when conducting a periodic inspection of the transmitter 21. Therefore, the number of times response transmission has been performed from the start of the use of the battery 30 until the life of the battery 30 runs out is small. In addition, this number can be inferred in advance.

If the result of reading of the number of times of the reception of response transmission using a scan tool indicates that the number of times of the reception is excessive, it is inferred that the transmitter 21 has received an unmodulated wave different from a trigger signal while misidentifying the unmodulated wave as a trigger signal.

Accordingly, the second embodiment has the following advantages.

(2-1) The transmitter controlling section 25 transmits a signal including the number of times of response transmission when the predetermined condition is met. By transmitting a signal including the number of times of response transmission to the receiver 40, the number of times of response transmission can be stored in the vehicle memory section 15 as diagnostic data. Through reading the diagnostic data using a scan tool, it is possible to confirm that an unmodulated wave different from a trigger signal has been received while being misidentified as a trigger signal. It is thus possible to check the influence of the reception of an unmodulated wave on the battery 30.

(2-2) The tire condition monitoring apparatus 20 includes the receiver 40 and the transmitter 21, which is capable of transmitting a signal including the number of times of response transmission. A system is established that allows the vehicle memory section 15 to store the number of times response transmission has been performed from the start of the use of the battery 30 until the life of the battery 30 runs out even after the life of the battery 30 runs out and the data of the memory section 25b is deleted. It is thus possible to check the influence of the reception of an unmodulated wave on the battery 30.

Next, a transmitter and a tire condition monitoring apparatus according to a third embodiment will be described. The detailed description of the components that are the same as those in the first embodiment will be omitted.

The transmitter controlling section 25 stores the number of times of response transmission in the memory section 25b. In the present embodiment, the number of times of response transmission stored in the memory section 25b is the accumulated number from the start of the use of the battery 30 (transmitter 21). In response to a trigger signal of a modulated wave, the transmitter controlling section 25 transmits a signal including the number of times of response transmission to the trigger device 50.

The transmitter controlling section 25 transmits a signal including the number of times of response transmission to the trigger device 50 when a trigger signal including a command requesting return of the number of times of response transmission is received by the trigger receiving section 60. This signal is the same as the signal in the second embodiment, that is, the signal shown in FIG. 7. The signal transmitted to the receiver 40 and the signal transmitted to the trigger device 50 are different from each other in the protocol, and have different preambles and synchronization bits.

When the trigger device reception circuit 53 receives a signal including the number of times of response transmission, the display 54 displays the number of times of response transmission. Thus, the trigger device 50 can be used to check the number of times response transmission has been performed from the start of the use of the battery 30 until the life of the battery 30 runs out.

As with the second embodiment, it can be determined from the number of times of response transmission whether the transmitter 21 has received an unmodulated wave different from a trigger signal while misidentifying the unmodulated wave as a trigger signal.

Accordingly, the third embodiment has the following advantages.

(3-1) When the trigger receiving section 60 receives a trigger signal of a modulated wave, the transmitter controlling section 25 transmits a signal including the number of times of response transmission stored in the memory section 25b. Thus, it is possible to check the influence of the reception of an unmodulated wave on the life of the battery 30 by using the trigger device 50.

(3-2) By using trigger device 50, it is possible to check the number of times of response transmission at an arbitrary time.

The embodiments may be modified as follows.

In the first embodiment, the determination as to whether to regard an unmodulated wave as a trigger signal may be made according to the number of times of response transmission. When an unmodulated wave is received, the transmitter controlling section 25 counts the number of times of response transmission (the number of times of the signal transmitted by response transmission). The memory section 25b stores the number of times of response transmission. The transmitter controlling section 25 performs the process without regarding an unmodulated wave as a trigger signal when the counted number of times reaches a predetermined number of times. The "predetermined number of times" is the number of times that response transmission is performed when, for example, an unmodulated wave is received for the predetermined time of the first embodiment.

In this case, the determination as to whether to regard an unmodulated wave as a trigger signal based on the reception time of the unmodulated wave is optional. If the determination as to whether to regard an unmodulated wave as a trigger signal based on the reception time of the unmodulated wave is not performed, the reception time of the unmodulated wave is not stored in memory section 25b. Therefore, it can be said that the memory section 25b stores at least one of the reception time of an unmodulated wave and the number of times of response transmission.

The reception time of an unmodulated wave reaching the predetermined time is defined as a first condition, and the number of times of response transmission reaching the predetermined number of times is defined as a second condition. When the determination as to whether to regard an unmodulated wave as a trigger signal is made based on both the reception time of the unmodulated wave and the number of times of response transmission, the transmitter controlling section 25 may regard the unmodulated wave not as a trigger signal when both the first condition and the second condition are met. Also, the transmitter controlling section 25 may regard the unmodulated wave not as a trigger signal when either the first condition or the second condition is met.

In the first embodiment, the determination as to whether to regard an unmodulated wave as a trigger signal may be made based on the time during which the unmodulated wave is continuously received while the vehicle 10 is at a stopped state. Alternatively, the determination may be made based on the accumulated time of reception of an unmodulated wave while the vehicle 10 is at a stopped state.

In the first embodiment, as the data configured to cause the receiver 40 mounted on the vehicle 10 to recognize that an unmodulated wave is not regarded as a trigger signal, the reception time of the unmodulated wave from stopping of the vehicle 10 until the restart of travel may be transmitted. In this case, the receiver controlling section 41 determines whether to regard an unmodulated wave received by the trigger receiving section 60 as a trigger signal based on the reception time of the unmodulated wave. That is, the receiver 40 may determine whether to regard an unmodulated wave as a trigger signal. As the data configured to cause the receiver 40 mounted on the vehicle 10 to recognize that an unmodulated wave is not regarded as a trigger signal, the number of times of response transmission from stopping of the vehicle 10 until the restart of travel may be transmitted. In this case, the receiver controlling section 41 determines whether to regard the unmodulated wave received by the trigger receiving section 60 as a trigger signal based on the number of times of response transmission.

In the first embodiment, traveling of the vehicle 10 is detected from the detection result of the acceleration sensor 24, and a signal including a flag is transmitted upon the detection of the traveling. Therefore, it can be said that the signal including a flag is transmitted when a predetermined condition for the detection result of the acceleration sensor 24 is met.

In the first embodiment, if it is determined that an unmodulated wave received by the trigger receiving section 60 is not regarded as a trigger signal, the transmitter controlling section 25 may shift to the state of restricting response transmission. Restriction of response transmission refers to any process that reduces the power consumption of the battery 30 and includes stopping response transmission, lowering the frequency of performing response transmission, lowering the output of response transmission, and shortening the data length of the signal transmitted by response transmission. The same control may be performed when the transmitter controlling section 25 of the second embodiment or the third embodiment is performing determination as to whether an unmodulated wave is regarded as a trigger signal.

In the first embodiment, the transmitter controlling section 25 may be configured to delete the reception time of an unmodulated wave from the memory section 25b each time traveling of the vehicle 10 is detected.

In the first embodiment, the determination as to whether to regard an unmodulated wave as a trigger signal may be made while the vehicle 10 is traveling.

In the first embodiment, in a case in which the transmitter controlling section 25 determines not to regard the received unmodulated wave as a trigger signal, the transmitter controlling section 25 may transmit a signal including a flag to the trigger device 50 when receiving a trigger signal of a modulated wave. In addition, in a case in which the transmitter controlling section 25 determines not to regard the received unmodulated wave as a trigger signal, the transmitter controlling section 25 may transmit a signal including a flag to the receiver 40 when the voltage detected by the voltage sensor 27 becomes lower than or equal to a predetermined voltage.

In the first embodiment and the second embodiment, the receiver controlling section 41 may be configured to store in the vehicle memory section 15 a flag or the number of times of response transmission through other devices such as the ECU 14.

Figure 8:
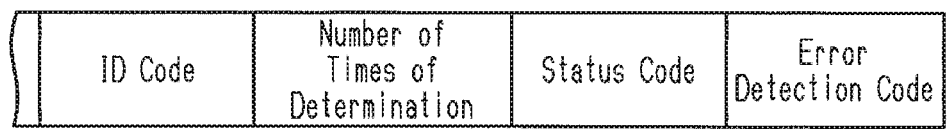
FIG. 8 is a diagram illustrating one example of a frame format of a signal transmitted to the receiver.

In the second embodiment and the third embodiment, the transmitter controlling section 25 may transmit a signal including a number of times of determination, which is the number of times an unmodulated wave is not regarded as a trigger signal (an unmodulated wave is regarded as a signal that is not a trigger signal), instead of the number of times of response transmission. As shown in FIG. 8, a signal including the number of times of determination includes, as data, an ID code, the number of times of determination, a stator scan code, and an error detection code. The transmitter controlling section 25 transmits a signal including the number of times of determination one or more times.

The transmitter controlling section 25 stores the number of times of response transmission in the memory section 25b, and determines as to whether to regard an unmodulated wave as a trigger signal based on the stored number of times of response transmission. The determination as to whether to regard an unmodulated wave as a trigger signal is made according to whether the number of times of response transmission has reached the predetermined number of times, as described above. The transmitter controlling section 25 stores in the memory section 25b the number of times the transmitter controlling section 25 has determined not to regard an unmodulated wave as a trigger signal.

The transmitter controlling section 25 causes the transmission circuit 26 to transmit a signal including the number of times of determination to the receiver 40 when the predetermined condition in the second embodiment is met.

The receiver controlling section 41 stores the number of times of determination in the vehicle memory section 15 as diagnostic data. That is, the vehicle memory section 15 stores the number of times it is determined that an unmodulated wave is not regarded as a trigger signal as diagnostic data. The use of a scan tool allows the influence of the reception of an unmodulated wave on the life of the battery to be checked.

The transmitter controlling section 25 may cause the transmission circuit 26 to transmit a signal including the number of times of determination to the trigger device 50 when a trigger signal including a command requesting return of the number of times of determination is received by the trigger receiving section 60. In this case, the display 54 of the trigger device 50 displays the number of times of determination. Thus, it is possible to check the influence of the reception of an unmodulated wave on the life of the battery 30 by using the trigger device 50.

Also, the determination as to whether to regard an unmodulated wave as a trigger signal may be made based on the reception time of the unmodulated wave. In this case, the transmitter controlling section 25 stores the reception time of an unmodulated wave in the memory section 25b. The determination as to whether to regard an unmodulated wave as a trigger signal is made by the same control as that in the first embodiment.

In the second embodiment and the third embodiment, the acceleration sensor 24 may be omitted.

In the second embodiment, the transmitter controlling section 25 may be configured to transmit, instead of the predetermined condition, a signal including the number of times of response transmission or the number of times of determination to the receiver 40 at predetermined intervals.

In the second embodiment, a signal including the number of times of response transmission or the number of times of determination, which is the number of times it is determined that an unmodulated wave is not regarded as a trigger signal, when the predetermined condition for the detection result of the acceleration sensor 24 is met. Specifically, the transmitter controlling section 25 transmits a signal including the number of times of response transmission or the number of times of determination when the centrifugal acceleration detected by the acceleration sensor 24 changes from a value below a threshold value to a value greater than or equal to the threshold value. Alternatively, the transmitter controlling section 25 may transmit a signal including the number of times of response transmission or the number of times of determination when the centrifugal acceleration detected by the acceleration sensor 24 changes from a value greater than or equal to the threshold value to a value below the threshold value. The threshold value here is the same threshold value as that in the first embodiment. In other words, the transmitter controlling section 25 transmits a signal including the number of times of response transmission or the number of times of determination when traveling of the vehicle 10 or a stopped state of the vehicle 10 is detected. Upon receiving a signal including the number of times of response transmission, the receiver 40 stores the number of times of response transmission included in the signal in the vehicle memory section 15 as diagnostic data. Upon receiving a signal including the number of times of determination, the receiver 40 stores the number of times of determination included in the signal in the vehicle memory section 15 as diagnostic data. The determination as to whether to regard an unmodulated wave as a trigger signal may be made based on the number of times of response transmission or the reception time.

In the second embodiment, the transmitter controlling section 25 may delete the number of times of response transmission stored in the memory section 25b as necessary. For example, the number of times of response transmission stored in the memory section 25b may be deleted when a signal including the number of times of response transmission is transmitted. Alternatively, the number of times of response transmission stored in the memory section 25b may be deleted when traveling is detected after transmission of a signal including the number of times of response transmission.

The receiver 40 stores the number of times of response transmission in the vehicle memory section 15 each time the receiver 40 receives a signal including the number of times of response transmission. By accumulating this number of times, it is possible to obtain the number of times of response transmission from the start of the use of the battery 30 until the end of the life of the battery 30. Likewise, in the third embodiment, the transmitter controlling section 25 may delete the number of times of response transmission stored in the memory section 25b as necessary.

In the third embodiment, the transmitter controlling section 25 may transmit a signal including the number of times of response transmission (or the number of times of determination) to the receiver 40 in response to a trigger signal of a modulation wave. Also, in response to a trigger signal of a modulated wave, the transmitter controlling section 25 may transmit a signal including the number of times of response transmission to both of the receiver 40 and the trigger device 50. In this case, a signal compliant with the protocol of the receiver 40 and a signal compliant with the protocol of the trigger device 50 are transmitted as signals including the number of times of response transmission.

In the second embodiment and the third embodiment, the memory section 25b may store the reception time of an unmodulated wave. The reception time stored in the memory section 25b is the accumulated time from the start of the use of the battery 30 (transmitter 21).

In the second embodiment, the transmitter controlling section 25 transmits a signal including the reception time to the receiver 40 when the predetermined condition is met.

In the third embodiment, the transmitter controlling section 25 transmits a signal including the reception time to at least one of the trigger device 50 and the receiver 40 in response to a trigger signal of a modulated wave. If the reception time is excessive, it is inferred that the transmitter 21 has received an unmodulated wave different from a trigger signal while misidentifying the unmodulated wave as a trigger signal.

The process of the second embodiment and the process of the third embodiment may be employed together. That is, the transmitter controlling section 25 may transmit a signal including the number of times of response transmission when the predetermined condition set for the detection result of the condition detecting section is met and the trigger receiving section 60 receives a trigger signal of a modulated wave.

In each of the above-described embodiments, a nonvolatile memory may be used as the memory section 25b. In the second embodiment, in a case in which a nonvolatile memory is used as the memory section 25b, the number of times of response transmission can be read from the memory section 25b even after the life of the battery 30 runs out. Therefore, in a case in which a nonvolatile memory is used as the memory section 25b, it is not necessary to transmit a signal including the number of times of response transmission to the receiver 40.

In each of the above-described embodiments, sensors other than the acceleration sensor 24 such as a shock sensor, an angular velocity sensor, a magnetic sensor may be used as the traveling detecting section. In each of the above-described embodiments, it is sufficient if one of the voltage sensor 27 and the acceleration sensor 24 is provided as the condition detecting section.

In each of the above-described embodiments, the vehicle 10 may be a motorcycle or a vehicle having five or more wheel assemblies 11.

The descriptions of the various embodiments of the present invention have been presented for purposes of illustration, but are not intended to be exhaustive or limited to the embodiments of the invention described. Many modifications and variations will be apparent to those of ordinary skill in the art without departing from the scope and spirit of the described embodiments of the invention. The terminology used herein was chosen to best explain the principles of the embodiments of the invention, the practical application or technical improvement over technologies found in the marketplace, or to enable others of ordinary skill in the art to understand the embodiments of the invention described herein.

The invention claimed is:

1. A transmitter configured to be attached to each of wheel assemblies provided in a vehicle and execute a process in accordance with a command included in a trigger signal transmitted from a trigger device, the transmitter comprising:
   a battery, which serves as a power source for the transmitter;
   a condition detecting section, which is configured to detect a condition of the transmitter;
   a trigger receiving section, which is configured to receive, as the trigger signal, an unmodulated wave having a received signal strength indication greater than or equal to a predetermined received signal strength indication;
   a transmitting section, which is configured to transmit a signal;
   a controlling section, which is configured to perform response transmission, by which the signal is transmitted to the transmitting section in response to the unmodulated wave, when the trigger receiving section receives the unmodulated wave;
   a memory section, which is configured to store at least one of reception time of the unmodulated wave and a number of times of the response transmission; and
   a traveling detecting section, which detects traveling and stopping of the vehicle, wherein the controlling section is configured to determine whether to regard, as the trigger signal, the unmodulated wave that is received by the trigger receiving section when the vehicle is at a stopped state, and cause the transmitting section to transmit the signal to a receiver mounted on the vehicle when traveling of the vehicle is detected after determining not to regard, as the trigger signal, the unmodulated wave that is received by the trigger receiving section when the vehicle is at a stopped state, and the signal includes data configured to cause the receiver to recognize that the unmodulated wave received when the vehicle is at a stopped state is not regarded as the trigger signal.

2. The transmitter according to claim 1, wherein
the memory section stores at least the reception time of the unmodulated wave, and
the controlling section is configured to determine whether to regard the unmodulated wave as the trigger signal based on the reception time of the unmodulated wave stored in the memory section.

3. The transmitter according to claim 1, wherein
the memory section stores at least the number of times of the response transmission, and
the controlling section is configured to determine whether to regard the unmodulated wave as the trigger signal based on the number of times of the response transmission stored in the memory section.

4. The transmitter according to claim 1, wherein
the memory section stores at least the number of times of the response transmission, and
the controlling section is configured to cause the transmitting section to transmit the signal to a receiver mounted on the vehicle when a predetermined condition set for a detection result of the condition detecting section is met, the signal including the number of times of the response transmission or a number of times it is determined that the unmodulated wave is not regarded as the trigger signal.

5. The transmitter according to claim 1, wherein
the trigger receiving section is capable of receiving a trigger signal of a modulated wave,
the memory section stores at least the number of times of the response transmission, and
the controlling section is configured to cause the transmitting section to transmit the signal to at least one of the trigger device and a receiver mounted on the vehicle in response to the trigger signal of a modulated wave received by the trigger receiving section, the signal including the number of times of the response transmission or a number of times it is determined that the unmodulated wave is not regarded as the trigger signal.

6. A tire condition monitoring apparatus comprising:
a transmitter, which is configured to be attached to each of wheel assemblies provided in a vehicle and execute a process in accordance with a command included in a trigger signal transmitted from a trigger device; and
a receiver mounted on the vehicle, wherein
the transmitter includes a battery, which serves as a power source for the transmitter, a condition detecting section, which is configured to detect a condition of the transmitter, a trigger receiving section, which is configured to receive, as the trigger signal, an unmodulated wave having a received signal strength indication greater than or equal to a predetermined received signal strength indication, a transmitting section, which is configured to transmit a signal, a controlling section, which is configured to perform response transmission, by which the signal is transmitted to the transmitting section in response to the unmodulated wave, when the trigger receiving section receives the unmodulated wave, a memory section, which is configured to store at least one of reception time of the unmodulated wave and a number of times of the response transmission, and a traveling detecting section, which detects traveling and stopping of the vehicle, wherein the controlling section is configured to determine whether to regard, as the trigger signal, the unmodulated wave that is received by the trigger receiving section when the vehicle is at a stopped state, and cause the transmitting section to transmit the signal to the receiver when traveling of the vehicle is detected after determining not to regard, as the trigger signal, the unmodulated wave that is received by the trigger receiving section when the vehicle is at a stopped state, wherein the signal includes data configured to cause the receiver to recognize that the unmodulated wave received when the vehicle is at a stopped state is not regarded as the trigger signal, wherein the receiver includes
   a receiving section, which is configured to receive a signal transmitted from the transmitting section, and
   a reception controlling section, which is configured to perform control of the receiver, and wherein the reception controlling section is configured to store the data included in the signal in a vehicle memory section mounted on the vehicle when the reception controlling section receives the signal.

\* \* \* \* \*